June 24, 1930.  J. LEWIS  1,766,523
STOVE RACK
Filed April 8, 1929
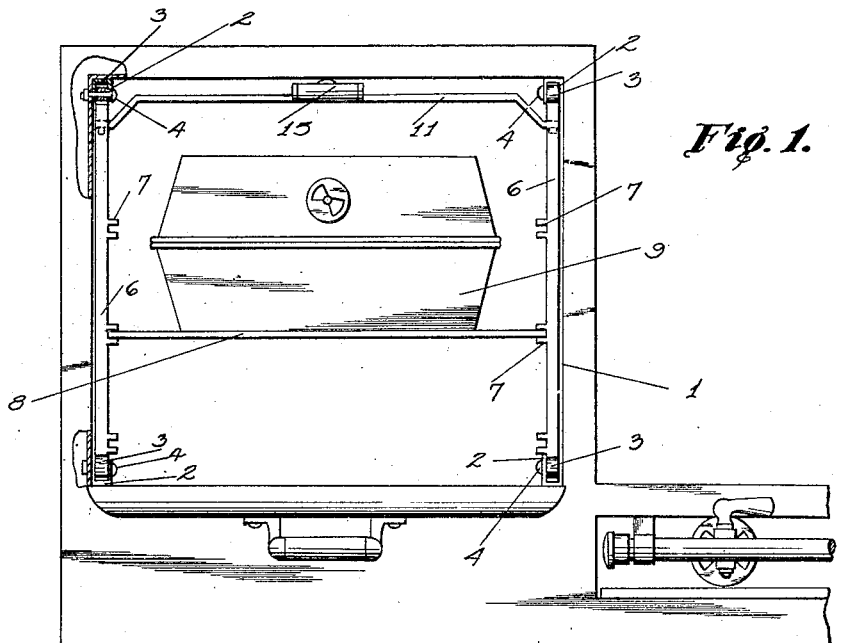
*Fig. 1.*
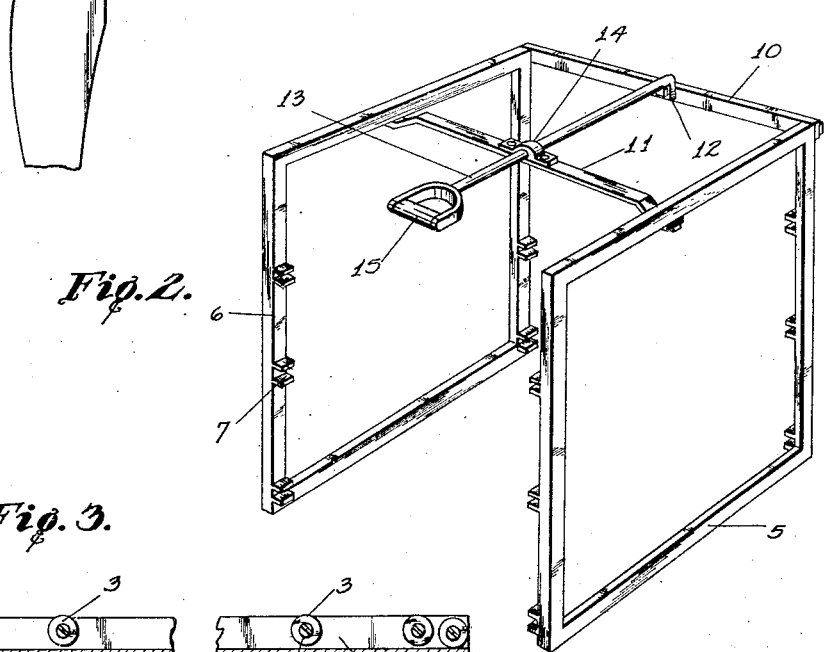
*Fig. 2.*
*Fig. 3.*
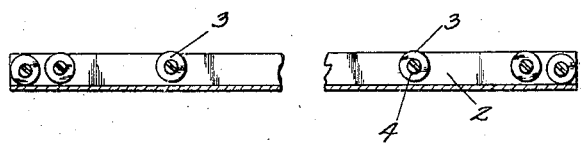
John Lewis
INVENTOR
BY Victor J. Evans
ATTORNEY
WITNESS:

Patented June 24, 1930

1,766,523

UNITED STATES PATENT OFFICE

JOHN LEWIS, OF ST. LOUIS, MISSOURI

STOVE RACK

Application filed April 8, 1929. Serial No. 353,453.

The object of this invention is to provide a stove oven with a slidable rack, which has adjustable shelves for baking pans thereon and whereby the rack may be moved partly through the oven so that the contents of the pans may be inspected, basted or turned in an easy and convenient manner without liability of the burning of the hands of the cook or subjecting her to unnecessary or excessive heat.

A still further object is to provide a rack for this purpose that is slidably mounted on tracks that carry anti-frictional rollers whereby the rack may be easily and conveniently moved into or partly out of the oven.

To the attainment of the foregoing and other objects which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a front elevation of a sufficient portion of a cook stove to illustrate the application of my improvement in the oven thereof, the oven door being open and parts of the stove being in section.

Figure 2 is a perspective view of the rack.

Figure 3 is a central longitudinal sectional view through one of the track rails for the rack.

Referring now to the drawings in detail, the numeral 1 designates the oven of an ordinary cook stove. Fixed in the corners of the oven 1 there are substantially U-shaped rails 2. Between the flanges of the rails 2 there are journaled rollers 3. Preferably the pivots 4 for the rollers secure the rails 2 in the oven.

The rollers 3 are designed to engage with the upper and lower edges of the sides 5 of my improved rack 6. Of course, the rack is constructed of suitable metal, as are the rails 2 and the rollers 3 and the pivots for the rollers. Each of the sides 5 of the rack is in the nature of a substantially rectangular frame and the uprights of these frames on their inner faces are formed with pairs of spaced lugs 7 between which are received racks 8 upon which rest the pan 9 that contains the food stuff to be baked. The sides 5, at the rear and upper corners thereof are connected by a plate 10. A second inner plate 11 connects the upper longitudinal members of the sides. Fixedly secured to the plate 10 is the angle end 12 of a rod 13 that is secured by a clip 14 to the plate 11, and the outer end of this rod is formed with a handle portion 15.

It will be apparent that a stove oven equipped with my improvement permits of food stuff baked therein being moved out of the oven for inspection, basting or turning without the liability of the cook subjecting herself to intense heat or burning her hands. The improvement is of a simple construction and the advantages thereof will, it is thought, be understood and appreciated without further detailed description. The invention is, of course, susceptible to such changes and modifications as fall within the scope of what I claim.

Having described the invention, I claim:

The combination with the oven of a cook stove, of substantially U-shaped rails fixed in the corners thereof, rollers pivoted between the sides of the rails and the pivots of the rollers securing the rails in the oven, a rack having side members whose upper and lower edges are mounted for movement on the rollers, and which sides have inwardly pairs of spaced lugs for the reception of a pan supporting rack therebetween, plates connecting the sides at the top thereof, a rod secured to said plates and said rod having an outer handle portion.

In testimony whereof I affix my signature.

JOHN LEWIS.